L. M. MYERS.
FRUIT PEELER.
APPLICATION FILED JULY 17, 1915.

1,204,179.

Patented Nov. 7, 1916.

Witness:
R. L. Farrington

Inventor
Laura Manger Myers.
By Glenn S. Noble Atty.

UNITED STATES PATENT OFFICE.

LAURA MANGER MYERS, OF CHICAGO, ILLINOIS.

FRUIT-PEELER.

1,204,179.  Specification of Letters Patent.  Patented Nov. 7, 1916.

Application filed July 17, 1915. Serial No. 40,500.

*To all whom it may concern:*

Be it known that I, LAURA MANGER MYERS, a citizen of the United States, residing at Chicago, in the county of Cook and State of Illinois, have invented certain new and useful Improvements in Fruit-Peelers, of which the following is a specification.

This invention relates more particularly to a device which is intended for peeling citrus fruit or the like.

The objects of this invention are to provide a device of this character which may be economically constructed, and which will be especially useful in scoring and removing fruit rinds.

Figure 1:
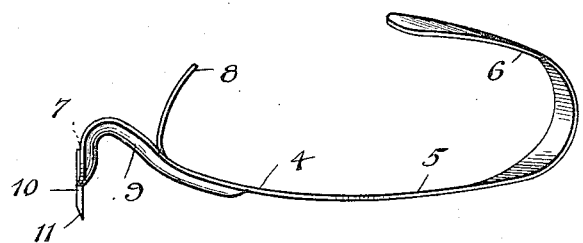
Figure 2:
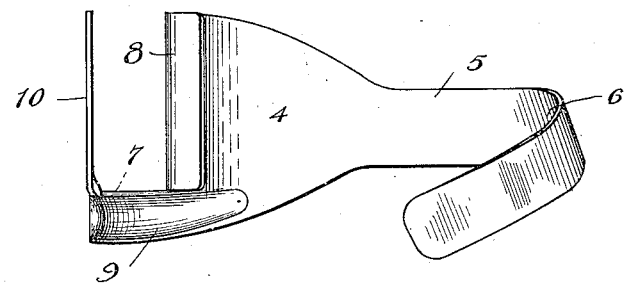
Figure 3:
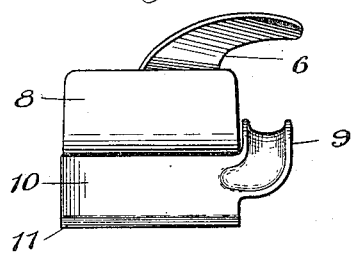

In the accompanying drawings illustrating a preferred form of this invention: Figure 1 is a side view of the peeler; Fig. 2 is a plan view of the same; and Fig. 3 is an end view taken from the left-hand end of Fig. 1.

As indicated in these drawings, 4 represents the main or body portion of the handle, which is preferably made sufficiently wide so as to fit between the palm and first joint of the forefinger. This body portion is tapered off and continued in a strap-like portion 5, which is bent around to form a loop 6, which fits over the outer edge of the hand. The other end of the body portion is cut, as indicated at 7, to form a guard 8, which is turned upwardly to engage with the forefinger. At the end of the guard is a neck-like portion 9, which is formed integrally with the body, and connects the body with the knife or cutting portion 10. The neck portion 9 may be grooved, as indicated, in order to strengthen the same. The knife or cutting portion 10 is also formed integrally with the body portion, that is, the entire device is preferably formed and stamped up out of sheet metal. The knife portion 10 is bent or twisted so as to stand in a plane at substantially right-angles to the body portion 4, and its lower edge is sharpened as indicated at 11. While I prefer to form the peeler from a single piece of sheet metal, it is obvious that it may be manufactured in other ways without departing from the scope of this invention.

When the peeler is to be used for peeling an orange or the like, the user grasps the handle, with the guard 8 extending along the forefinger, and the loop 6 engaging the outer portion of the hand. It will be seen that the body 4 and guard 8 tend to fully protect the hand, as well as forming a substantial grasp. The outer corner of the blade may be used for scoring the peeling, and then the edge of the blade used for removing the peeling from the fruit. It will be seen that, as the skin or rind is cut away from the fruit, it will pass up between the blade 10 and the guard 8, and will not come in contact with the fingers.

Having thus described my invention, which, however, I do not wish to limit to the exact construction shown and described, except as specified in the following claims, what I claim and desire to secure by Letters Patent is:

1. A fruit peeler comprising a body portion, having an integrally formed strap for engagement with the outer part of the hand, and an integrally formed guard for engagement with the forefinger, such body portion also having a projection at one end of the guard with a knife blade formed integrally therewith, said blade lying substantially parallel to the guard and in a plane at substantially right-angles to the plane of the body portion and in spaced relation to the guard.

2. A fruit peeler formed of a single piece of sheet metal, having a body portion adapted to fit the hand, said body portion being continued at one end to form a loop for engagement with the outer part of the hand, and having an upwardly turned guard at the other end, a cutting blade arranged adjacent to said guard, and in spaced relation thereto to form a passageway between the blade and guard, to permit the passage of the fruit peeling as it is removed from the fruit, and a support for a blade comprising an extension at one end of the guard.

3. In a device of the character set forth, the combination of a handle for engagement with a hand, said handle having a loop at one end, and a guard at the other end, a knife arranged substantially parallel to the guard and in spaced relation thereto, and in a plane approximately at right-angles to the plane of the main portion of the handle, said blade being supported by an extension at one end of the guard.

4. A fruit peeler comprising a plate shaped to form a body portion for engagement with the hand, said body portion having a strap-like extension forming a loop for engagement with the outer portion of the hand, the other end of said plate being cut, and one portion bent up to form a guard, and another portion bent down to form a knife blade substantially parallel to the guard and at a distance therefrom, said blade being supported by an extension at one end of the guard.

LAURA MANGER MYERS.

Copies of this patent may be obtained for five cents each, by addressing the "Commissioner of Patents, Washington, D. C."